US010255125B2

(12) United States Patent
Terashita et al.

(10) Patent No.: US 10,255,125 B2
(45) Date of Patent: Apr. 9, 2019

(54) REPORT CREATION SYSTEM AND PROGRAM

(71) Applicants: KABUSHIKI KAISHA TOSHIBA, Tokyo (JP); TOSHIBA SOLUTIONS CORPORATION, Kawasaki-shi, Kanagawa (JP)

(72) Inventors: Yosuke Terashita, Chiba (JP); Kaori Morishita, Saitama (JP); Chika Nakazato, Tokyo (JP)

(73) Assignees: Kabushiki Kaisha Toshiba, Tokyo (JP); Toshiba Digital Solutions Corporation, Kawasaki-shi, Kanagawa (JP)

( * ) Notice: Subject to any disclaimer, the term of this patent is extended or adjusted under 35 U.S.C. 154(b) by 690 days.

(21) Appl. No.: 14/640,889

(22) Filed: Mar. 6, 2015

(65) Prior Publication Data
US 2015/0178141 A1    Jun. 25, 2015

Related U.S. Application Data

(63) Continuation of application No. PCT/JP2012/072741, filed on Sep. 6, 2012.

(51) Int. Cl.
*G06F 11/00*     (2006.01)
*G06F 11/07*     (2006.01)
*G06Q 10/06*     (2012.01)

(52) U.S. Cl.
CPC ...... *G06F 11/0769* (2013.01); *G06F 11/0709* (2013.01); *G06Q 10/0639* (2013.01)

(58) Field of Classification Search
CPC ............. G06F 11/0769; G06F 11/0709; G06Q 10/0639
(Continued)

(56) References Cited

U.S. PATENT DOCUMENTS 5,339,250 A *  8/1994  Durbin .................... G07F 5/18
                                                  221/9
8,209,567 B2 *  6/2012  Cohen ................. G06F 11/3476
                                                  714/26
(Continued)

FOREIGN PATENT DOCUMENTS

JP    2000-276524     10/2000
JP    2002-109401      4/2002
(Continued)

OTHER PUBLICATIONS

"IBM Tivoli Service Level Advisor," www.06.ibm.com/software/jp/tivoli/products/service_level/merit.html, Aug. 6, 2012 (with concise English-language explanation of relevance).
(Continued)

*Primary Examiner* — Yair Leibovich
(74) *Attorney, Agent, or Firm* — Finnegan, Henderson, Farabow, Garrett & Dunner, L.L.P.

(57) ABSTRACT

A report creation system according to one embodiment creates a report indicative of a condition of a cooperative service in which a plurality of services are made to cooperate, the plurality of services being provided by a plurality of service providing apparatuses including at least one service providing apparatus in another company. The report creation creates the report, based on the first log information and the error occurrence information collected by each of the information collection apparatuses, and second log information of each of the services collected from each of the service providing apparatuses.

6 Claims, 12 Drawing Sheets

(58) Field of Classification Search
USPC .......................................................... 714/57
See application file for complete search history.

(56) References Cited

U.S. PATENT DOCUMENTS

| | | | | |
|---|---|---|---|---|
| 8,621,287 | B1* | 12/2013 | Ethington | G06F 11/0709 |
| | | | | 714/25 |
| 8,819,477 | B1* | 8/2014 | Thakare | G06F 11/0769 |
| | | | | 714/4.1 |
| 2009/0172168 | A1 | 7/2009 | Sonoda et al. | |
| 2010/0076987 | A1* | 3/2010 | Schreiner | G06Q 30/02 |
| | | | | 707/754 |
| 2011/0038467 | A1* | 2/2011 | Jin | H04M 3/36 |
| | | | | 379/88.17 |

FOREIGN PATENT DOCUMENTS

| | | |
|---|---|---|
| JP | 2003-242228 | 8/2003 |
| JP | 2006-4169 | 1/2006 |
| JP | 2006-99417 | 4/2006 |
| JP | 2010-117757 | 5/2010 |
| JP | 2011-90429 | 5/2011 |
| WO | WO 2008/041302 | 4/2008 |

OTHER PUBLICATIONS

"ManageEngine ServiceDesk Plus," www.manageengine.jp/products/ServiceDesk_Plus/sla-management.html, Aug. 6, 2012 (with concise English-language explanation of relevance).
International Preliminary Report on Patentability and Written Opinion issued by the International Bureau of WIPO dated Mar. 19, 2015, for International Application No. PCT/JP2012/072741.
English-language International Search Report from the Japanese Patent Office for International Application No. PCT/JP2012/072741, dated Oct. 2, 2012.

* cited by examiner

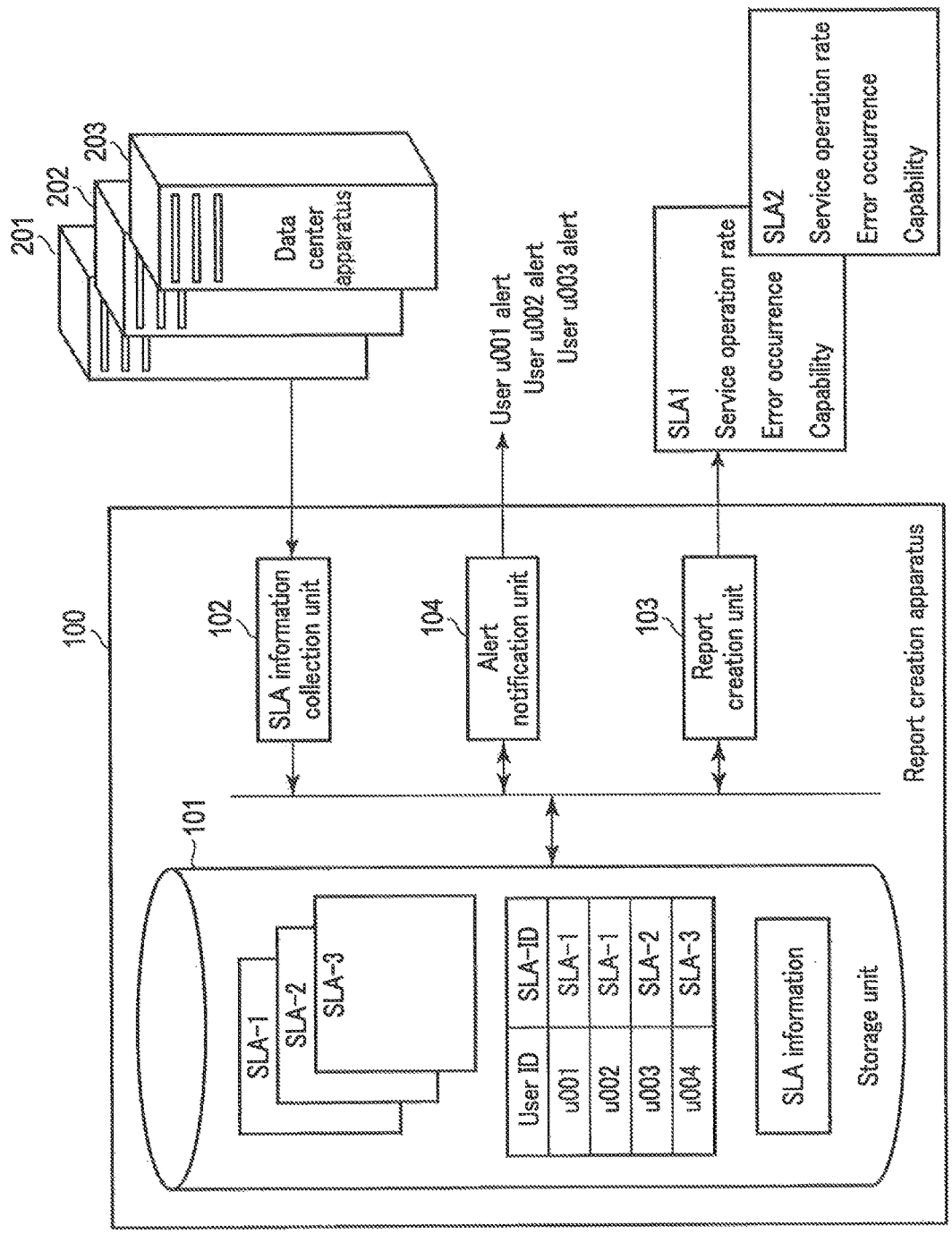
F I G. 1

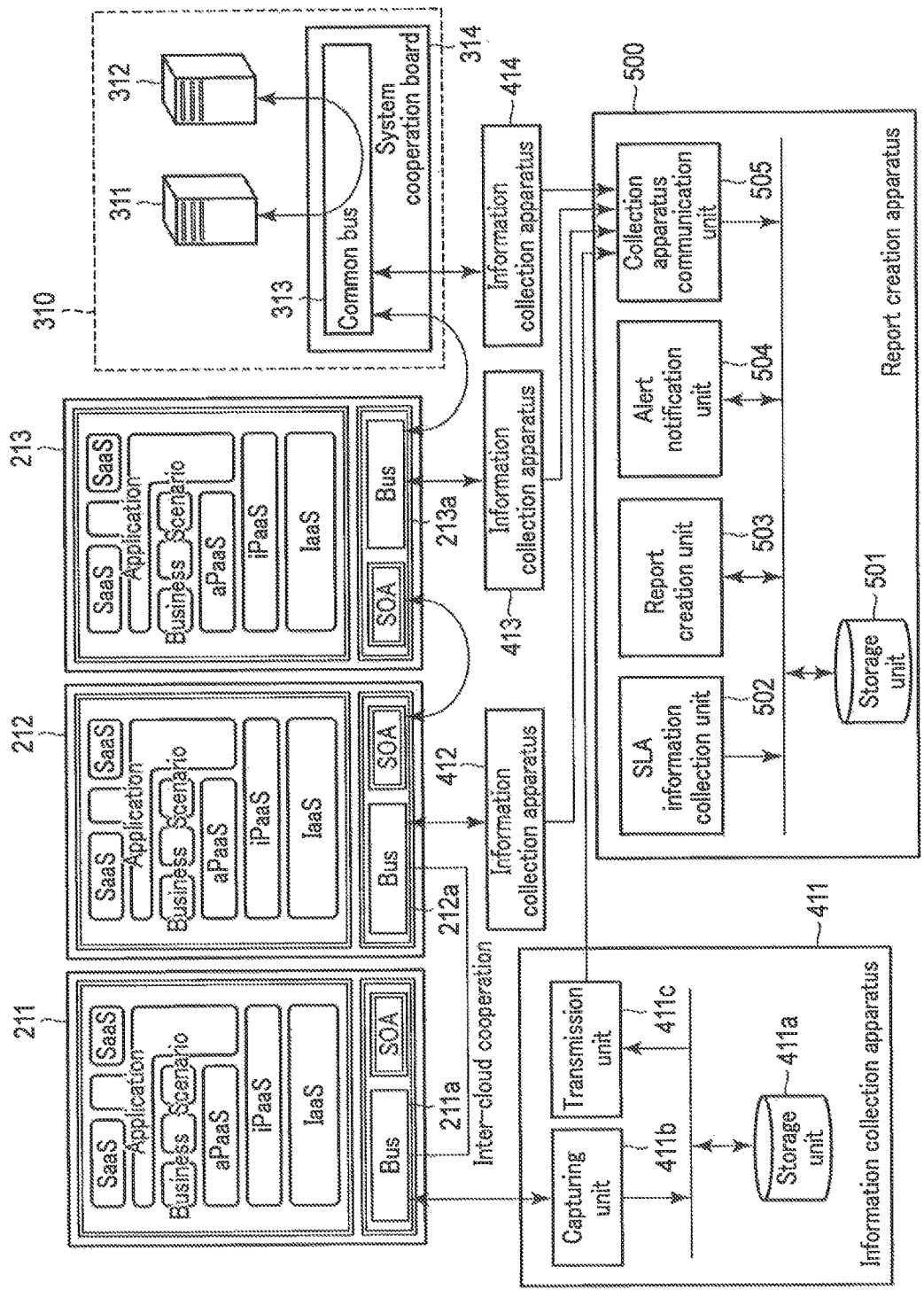
F I G. 3

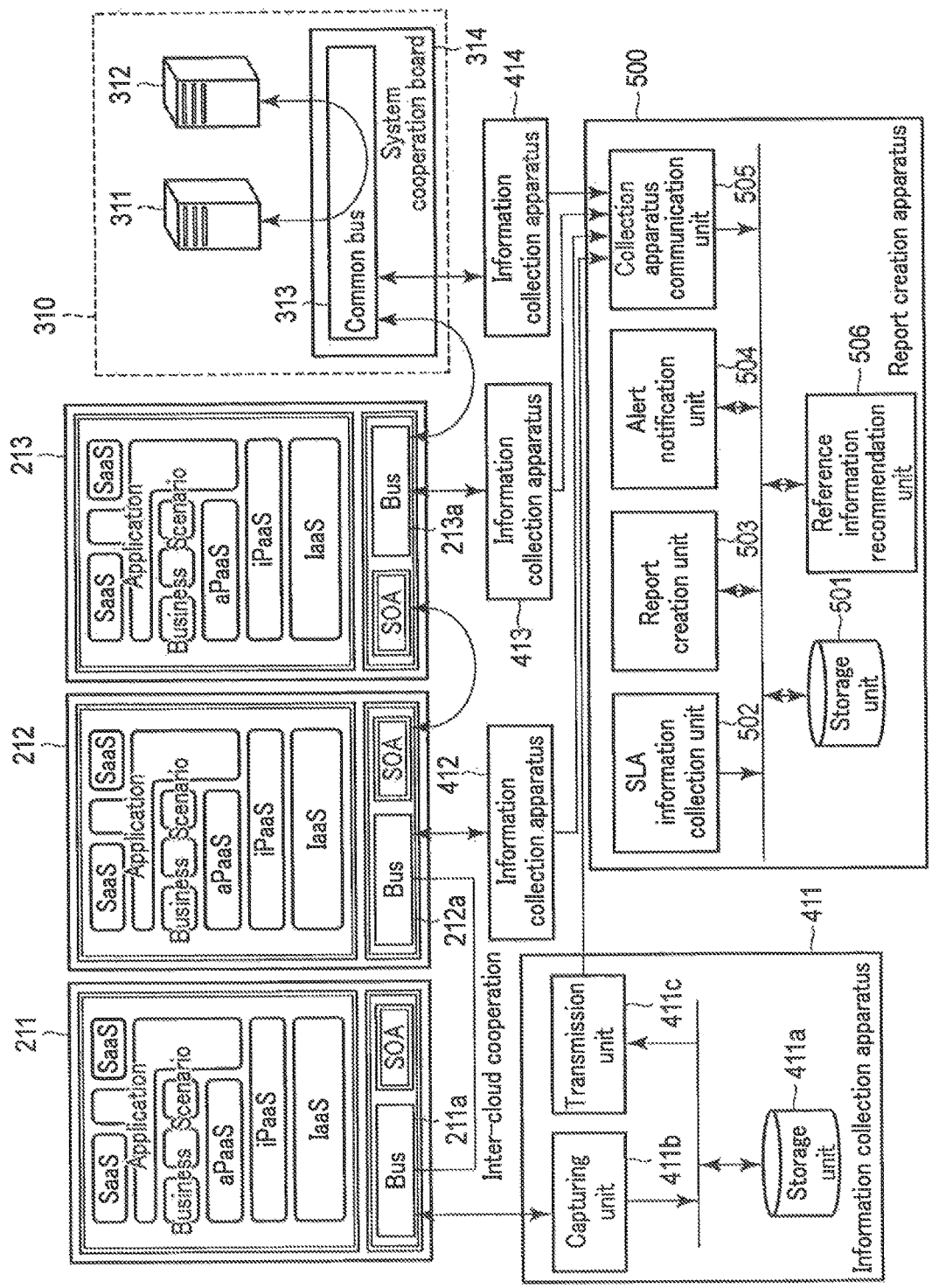
F I G. 4

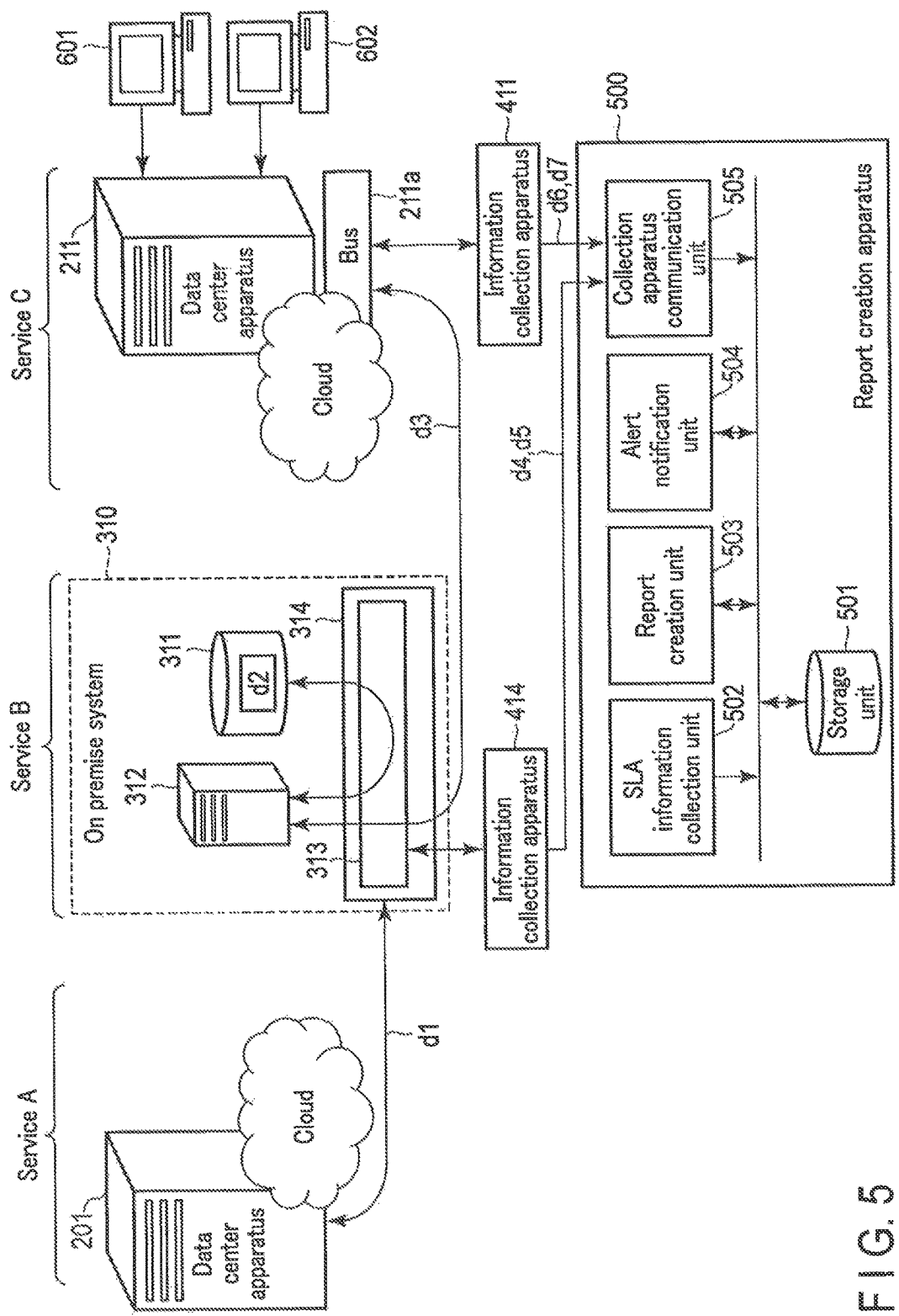
F I G. 5 d1

| Area | Date/time | Weather | Temperature (° C) | Humidity (%) | Sunshine rate |
|---|---|---|---|---|---|
| 1 | 2010/7/3 15:00:00 | 1 | 32 | 60 | 0.5 |

F I G. 6 d2

| Area | Date/time | Weather | Temperature (° C) | Humidity (%) | Sunshine rate | Power output actual result (%) | Load demand actual result (10000 kw) |
|---|---|---|---|---|---|---|---|
| 1 | 2010/7/3 15:00:00 | 1 | 31 | 58 | 0.6 | 58 | 5000 |

F I G. 7 d3

| Date/time | Power output estimation (%) | Load demand estimation (10000 kw) |
|---|---|---|
| 2010/7/4 15:00:00 | 52 | 4500 |

F I G. 8 d4

| Date/time | Job ID | Task ID | Service ID | Type |
|---|---|---|---|---|
| 2012/5/15 15:05:01 | 1011 | 101 | A | Request |
| 2012/5/15 15:05:05 | 1011 | 101 | A | Response |

FIG. 9 d5

| Date/time | Error occurrence location | Error code |
|---|---|---|
| 2012/5/15 15:05:01 | B | 1011 |

FIG. 10 d6

| Date/time | Job ID | Task ID | Service ID | Type |
|---|---|---|---|---|
| 2012/5/15 15:05:04 | 1012 | 101 | C | Transmission |

FIG. 11 d7

| Date/time | Error occurrence location | Error code |
|---|---|---|
| 2012/5/15 15:05:04 | C | 1011 |

FIG. 12 d8

| Date/time | Job ID | Task ID | Service ID | Type |
|---|---|---|---|---|
| 2012/5/15 15:05:01 | 1011 | 101 | A | Request |
| 2012/5/15 15:05:04 | 1012 | 101 | C | Transmission |
| 2012/5/15 15:05:05 | 1011 | 101 | A | Response |

FIG. 13 d9

| Date/time | Error occurrence location | Error code |
|---|---|---|
| 2012/5/15 15:05:01 | B | 1011 |
| 2012/5/15 15:05:04 | C | 1011 |
| 2012/5/15 15:15:15 | B | 1011 |
| 2012/5/15 15:30:20 | C | 1011 |
| 2012/5/15 15:40:45 | B | 2057 |

FIG. 14 d10

| Service ID | Response time (msec) |
|---|---|
| A-B | 10 |
| A-C | 8 |
| A-C | 15 |
| B1-B2 | 10 |

FIG. 15

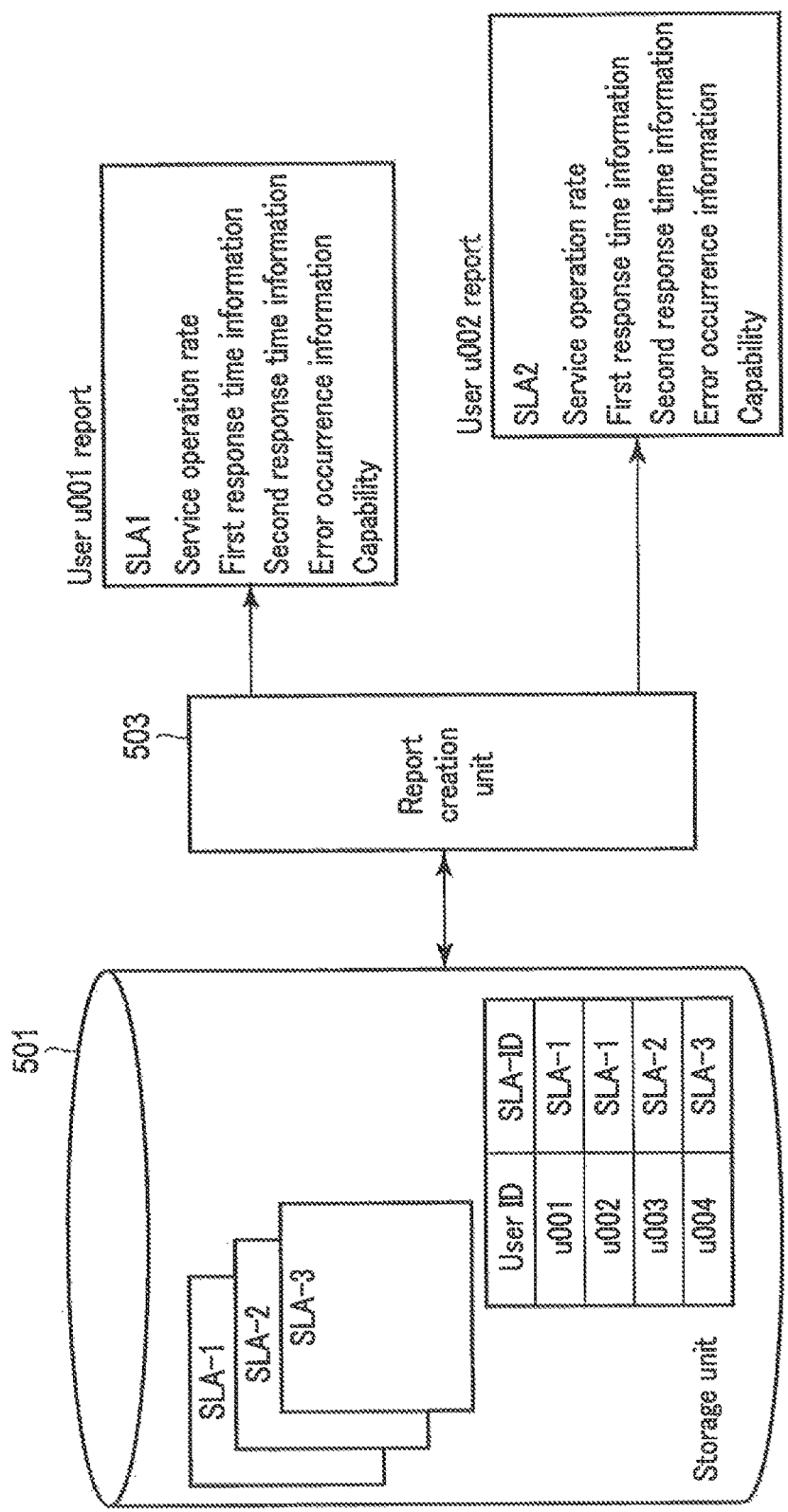
F I G. 16

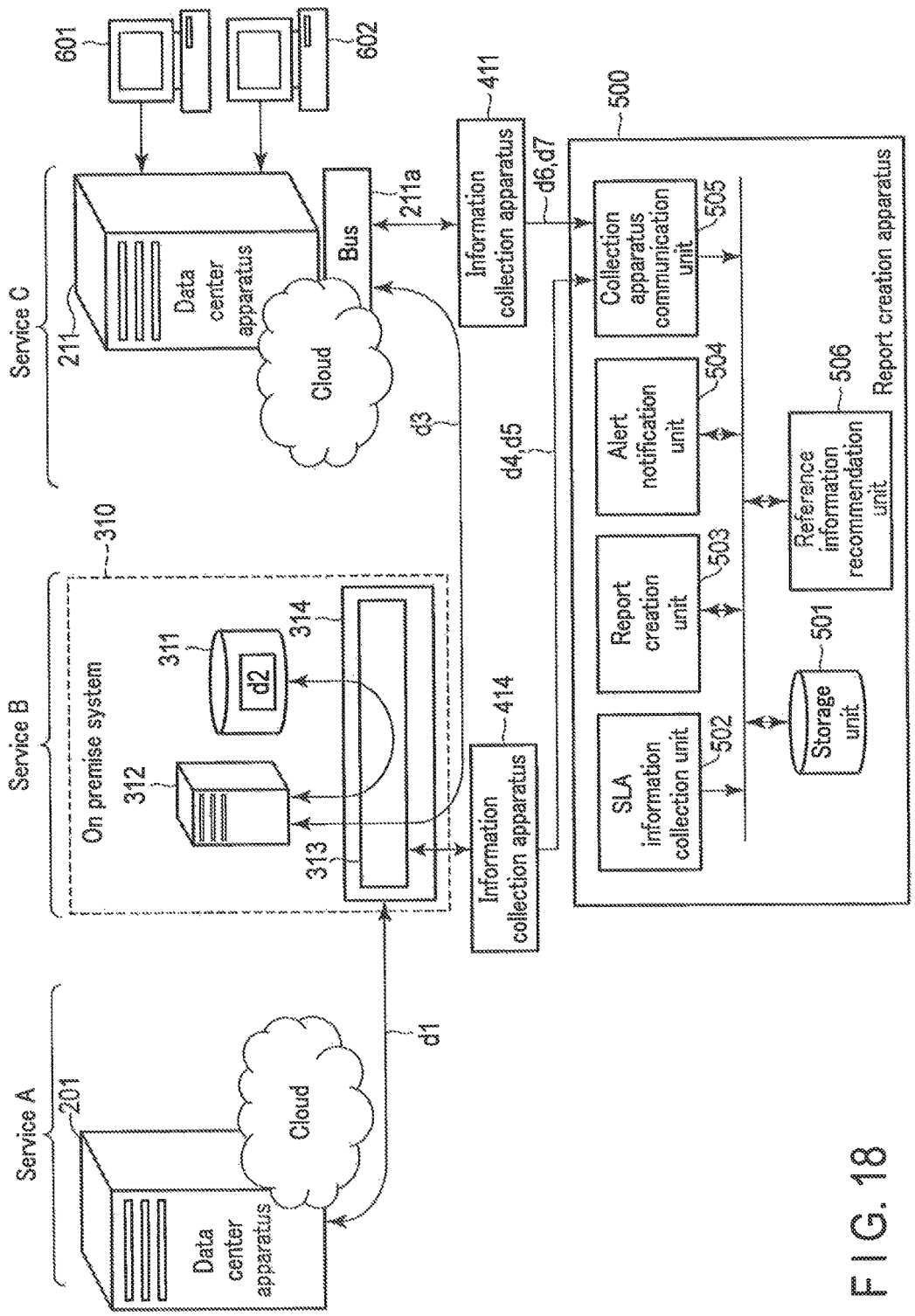
F I G. 18

REPORT CREATION SYSTEM AND PROGRAM

CROSS-REFERENCE TO RELATED APPLICATIONS

This is a Continuation Application of PCT application No. PCT/JP2012/072741, filed on Sep. 6, 2012, which was published under PCT Article 21(2) in Japanese.

FIELD

Embodiments described herein relate generally to a report creation system and a program.

BACKGROUND

In cloud services and data center services, it is imperative that service providers set service level agreements (hereinafter, also referred to as SLAs) for users, and periodically send SLA reports showing actual results on the SLAs.

FIG. 1 is a schematic view illustrating a conventional report creation apparatus and a peripheral configuration thereof. A report creation apparatus 100 of a service provider includes a storage unit 101 which stores service level agreements SLA-1 to SLA-3 for respective users, a table which user IDs for identifying users and SLA-IDs for identifying SLAs are associated, and SLA information which is collected from data center apparatuses 201 to 203.

An SLA information collection unit 102 collects SLA information, such as service log information, the state of an OS and the state of hardware, with respect to each service and tenant in the data center apparatuses 201 to 203, and writes the SLA information in the storage unit 101.

A report creation unit 103 calculates, based on the SLA information written in the storage unit 101, service level information such as a service operation rate and online response time indicated in the SLA-1 to SLA-3 in the storage unit 101.

The report creation unit 103 individually collates the calculated service level information and the service level agreements SLA-1 to SLA-3 of respective users, creates SLA reports SLA1, SLA2, . . . , which include the collated service level information, and sends the SLA reports to the users.

In addition, if the collated result indicates an SLA violation, an alert notification unit 104 creates an alert for each user, such as a user u001 alert or a user u002 alert, which indicates an SLA violation, and notifies the alert to an administrator.

In recent years, in place of an elemental service which provides an elemental cloud service or data center service, there has been an increasing number of cooperative services such as an inter-cloud cooperative service or a cloud-on premise (on premise: a company's own system) cooperative service. In the cooperative service, a plurality of data center apparatuses 201 to 203 and an on premise system 300 are made to cooperate. Each data center apparatus, 201 to 203, is realized by cloud computing which provides a service by IaaS (infrastructure as a service), iPaaS (integrated platform as a service), aPaaS (application PaaS), a business scenario, an application, or SaaS (software as a service). The on premise system 300 includes a plurality of on premise apparatuses 301, 302. In connection with such a cooperative service, the report creation apparatus 100 needs to collect information of the overall service, in addition to the SLA information of elemental services.

The report creation apparatus 100 can collect SLA information of elemental services, but it is difficult for the report creation apparatus 100 to collect the information of the overall service from the cooperative service, such as a response time between services or an error occurrence location.

A problem to be solved by the present invention is to provide a report creation system and a program, which can collect information of an overall service from a cooperative service.

BRIEF DESCRIPTION OF THE DRAWINGS

FIG. 1 is a schematic view illustrating a conventional report creation apparatus and a peripheral configuration thereof.

FIG. 3 is a schematic view illustrating a report creation system according to a first embodiment and a peripheral configuration thereof.

FIG. 4 is a schematic view illustrating a report creation system according to a third embodiment and a peripheral configuration thereof.

FIG. 5 is a schematic view illustrating a report creation system according to a fourth embodiment and a peripheral configuration thereof.

FIG. 6 is a schematic view illustrating an example of weather forecast data in the embodiment.

FIG. 7 is a schematic view illustrating an example of past power actual result data in the embodiment.

FIG. 8 is a schematic view illustrating an example of power demand estimation data in the embodiment.

FIG. 9 is a schematic view illustrating an example of first log information in the embodiment.

FIG. 10 is a schematic view illustrating an example of error occurrence information in the embodiment.

FIG. 11 is a schematic view illustrating an example of first log information in the embodiment.

FIG. 12 is a schematic view illustrating an example of error occurrence information in the embodiment.

FIG. 13 is a schematic view illustrating an example of first log information in the embodiment.

FIG. 14 is a schematic view illustrating an example of error occurrence information in the embodiment.

FIG. 15 is a schematic view illustrating an example of first response time information in the embodiment.

FIG. 16 is a schematic view for describing report creation in the embodiment.

FIG. 18 is a schematic view illustrating a report creation system according to a fifth embodiment and a peripheral configuration thereof.

DETAILED DESCRIPTION

Figure 2:
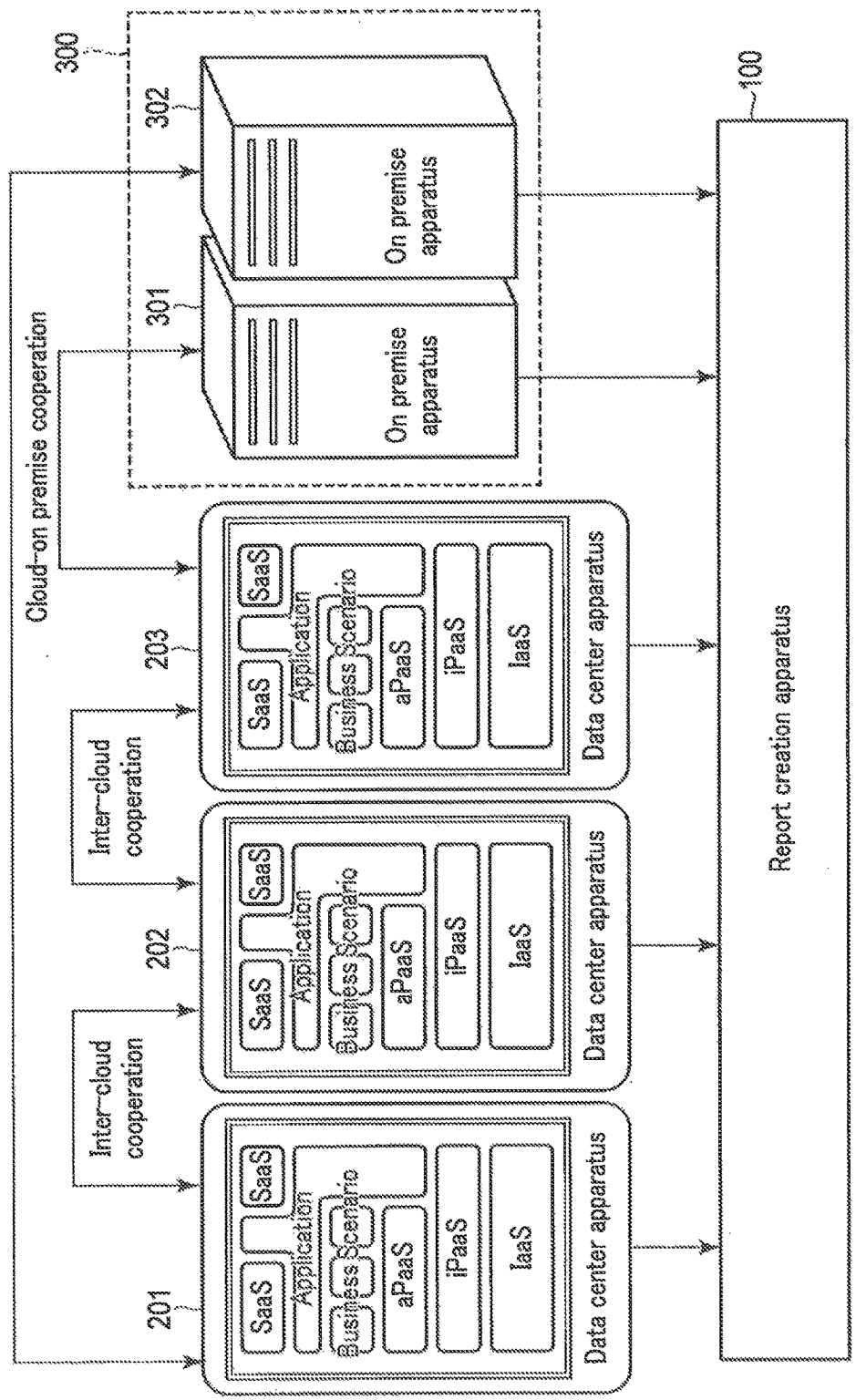
FIG. 2 is a schematic view for describing a conventional cooperative service.

In general, according to one embodiment, a report creation system creates a report indicative of a condition of a cooperative service in which a plurality of services are made to cooperate, the plurality of services being provided by a plurality of service providing apparatuses including at least one service providing apparatus in another company.

The report creation system includes a plurality of information collection apparatuses and a report creation apparatus.

The plurality of information collection apparatuses are individually provided on a plurality of buses for individual cooperation between the plurality of services, and are each configured to collect first log information including an information type, a service ID and date/time information, and error occurrence information including an error code, an error occurrence location and date/time information, from request information and response information flowing in each of the buses.

The report creation apparatus is configured to create the report, based on the first log information and the error occurrence information collected by each of the information collection apparatuses, and second log information of each of the services collected from each of the service providing apparatuses.

Each of the information collection apparatuses includes a first storage device, a capturing device and a transmission device.

The first storage device stores the first log information and the error occurrence inforation.

The capturing device captures the request information and the response information from the bus, collects the first log information and the error occurrence information from the captured request information and response information, and writes the first log information and the error occurrence information in the first storage device.

The transmission device transmits the first log information and the error occurrence information in the first storage device to the report creation apparatus.

The report creation apparatus includes a second storage device, a first collection device, a reception device, a first calculation device, a second calculation device, and a report creation device.

The second storage device stores the first log information, the error occurrence information and the second log information.

The first collection device collects the second log information from each of the service providing apparatuses, and writes the second log information in the second storage device.

The reception device receives the first log information and the error occurrence information from each of the information collection apparatuses, and writes the first log information and the error occurrence information in the second storage device.

The first calculation device calculates first response time information which is indicative of a response time between the respective services, based on a difference between date/time information of request information indicated by the first log information in the second storage device, and date/time information of response information to the request information.

The second calculation device calculates second response time information which is indicative of a response time with respect to each of the services, based on a difference between date/time information of request information of each service indicated by the second log information in the second storage device, and date/time information of response information to the request information.

The report creation device creates the report including the calculated first response time information and second response time information, and the error occurrence information in the second storage device.

Embodiments will be described hereinafter with reference to the accompanying drawings. An information collection apparatus and a report creation apparatus to be described below can be implemented by either a hardware configuration or a combined configuration of hardware resources and software. As the software of the combined configuration, use is made of a program which is preinstalied in a computer over a network or from a storage medium, and, which causes this computer to execute functions of the associated apparatus.

First Embodiment

FIG. 3 is a schematic view illustrating a report creation system according to a first embodiment and a peripheral configuration thereof. A plurality of data center apparatuses 211 to 213 and a plurality of on premise apparatuses 311 and 312 provide a cooperative service in which a plurality of services are made to cooperate. In this case, the plural data center apparatuses 211 to 213 and plural on premise apparatuses 311 and 312 constitute a plurality of service providing apparatuses including at least one service providing apparatus in another company (data center apparatus 211, 212 or 213).

Each of the data center apparatuses 211 to 213 is realized by cloud computing which provides a service by IaaS in the same manner as described above. In addition, the respective data center apparatuses 211 to 213 individually include buses 211a to 213a for making respective services cooperate, based on a service oriented architecture (SOA).

The respective on premise apparatuses 311 and 312 are connected to a common bus 313 for making the respective services cooperate. The common bus 313 is provided on a system cooperation board 314 for implementing cooperation between the respective data center apparatuses 211 to 213 and the respective on premise apparatuses 311 and 312. The on premise apparatuses 311 and 312, common bus 313 and system cooperation board 314 constitute an on premise system 300.

The report creation system creates a report showing the condition of the cooperative service which is provided by the plural data center apparatuses 211 to 213 and plural on premise apparatuses 311 and 312. Specifically, the report creation system includes a plurality of information collection apparatuses 411 to 414 and a report creation apparatus 500.

The plural information collection apparatuses 411 to 414 are individually provided on the plural buses 211a to 213a, and 313 for individual cooperation between a plurality of services, and collects first log information including an information type, a service ID and date/time information, and error occurrence information including an error code, an error occurrence location and date/time information, from request information and response information flowing in the respective buses 211a to 213a, and 313.

In this case, since the functional blocks of the respective information collection apparatuses 411 to 414 are mutually identical, the information collection apparatus 411 is described as a typical example.

The information collection apparatus 411 includes a storage unit 411a, a capturing unit 411b and a transmission unit 411c.

The storage unit (first storage device) 411a is a storage device which can execute read/write from/in the respective units 411b and 411c and is configured to store the above-described first log information and error occurrence information.

The capturing unit 411*b* includes a function of capturing the above-described request information and response information from the bus 211*a*, collecting the first log information and error occurrence information from the captured request information and response information, and writing the first log information and error occurrence information in the storage unit 411*a*.

The transmission unit 411*c* includes a function of transmitting the first log information and error occurrence information in the storage unit 411*a* to the report creation apparatus 500.

On the other hand, the report creation apparatus 500 creates a report, based on the first log information and error occurrence information collected by each information collection apparatus, 411 to 414, and second log information of each service collected from the respective data center apparatuses 211 to 213 functioning as service providing apparatuses, and the respective on premise apparatuses 311 and 312. Incidentally, the second log information includes the service log information of the above-described SLA information. In addition, the second log information may further include the state of the OS and the state of hardware of the above-described SLA information.

In this case, the report creation apparatus 500 includes a storage unit 501, an SLA information collection unit 502, a report creation unit 503, an alert notification unit 504 and a collection apparatus communication unit 505.

The storage unit (second storage device) 501 is a storage device which can execute read/write from/in the respective units 502 to 505 and is configured to store the first log information, error occurrence information and second log information. Incidentally, the storage unit 501 stores, in addition to the first log information, error occurrence information and second log information, the service level agreements SLA-1 to SLA-3 for respective users, and the table in which user IDs for identifying users and SLA-IDs for identifying SLAs are associated, in the same manner as described above.

The SLA information collection unit 502 includes a first collection function of collecting second log information from the respective data center apparatuses 211 to 213 functioning as service providing apparatuses, and the respective on premise apparatuses 311 and 312, and writing the second log information in the storage unit 501.

The report creation unit 503 includes the following functions (f503-1) to (f503-3).

(f503-1) A first calculation function of calculating first response time information which is indicative of a response time between respective services, based on a difference between date/time information of request information indicated by the first log information in the storage unit 501, and date/time information of response information to the request information.

(f503-2) A second calculation function of calculating second response time information which is indicative of a response time with respect to each service, based on a difference between date/time information of request information of each service indicated by the second log information in the storage unit 501, and date/time information of response information to the request information.

(f503-3) A report creation function of creating a report including the calculated first response time information and second response time information, and the error occurrence information in the storage unit 501.

Incidentally, the report creation unit 503 may calculate, based on the SLA information written in the storage unit 101, service level information (e.g., service operation rate) indicated in the SLA-1 to SLA-3 in the storage unit 101, in the same manner as described above.

In addition, the report creation unit 503 may individually collate the service level information (e.g., first response time information, second response time information and service operation rate) calculated by the respective calculation functions and the service level agreements SLA-1 to SLA-3 of respective users.

Further, the report creation unit 503 may include a function of creating SLA reports SLA1, SLA2, . . . , which include the collated service level information, and sending the SLA reports to the users.

The alert notification unit 504 includes a function of creating, if the collated result indicates an SLA violation, an alert for each user, which indicates an SLA violation, and notifying the alert to the administrator, in the same manner as described above. Incidentally, the alert notification unit 504 may be configured as one function of the report creation module 503.

The collection apparatus communication unit 505 includes a reception function of receiving first log information and error occurrence information from the respective information collection apparatuses 411 to 414, and writing the first log information and error occurrence information in the storage unit 501.

Next, the operation of the report creation apparatus with the above-described structure is described.

Each of the data center apparatuses 211 to 213 and each of the on premise apparatuses 311 and 312 provides a cooperative service in which a plurality of services are made to cooperate.

In the information collection apparatus 411, the capturing unit 411*b* captures the request information and response information flowing in the bus 211*a*, and collects the first log information including an information type, a service ID and date/time information, and the error occurrence information including an error code, an error occurrence location and date/time information, from the captured request information and response information. The collected first log information and error occurrence information is written in the storage unit 411*a* by the capturing unit 411*b*.

The transmission unit 411*c* of the information collection apparatus 411 transmits the first log information and error occurrence information in the storage unit 411*a* to the report creation apparatus 500.

Similarly, in the other information collection apparatuses 412 to 414, the first log information and error occurrence information is collected from the request information and response information flowing in each bus 212*a*, 213*a*, 313, and the first log information and error occurrence information is transmitted to the report creation apparatus 500.

In the report creation apparatus 500, the collection apparatus communication unit 505 receives the first log information and error occurrence information from the respective information collection apparatuses 411 to 414, and writes the first log information and error occurrence information in the storage unit 501.

In addition, in the report creation apparatus 500, the SLA information collection unit 502 collects the second log information of each service from the respective data center apparatuses 211 to 213 and the respective on premise apparatuses 311 and 312, and writes the second log information in the storage unit 501.

Thereafter, in the report creation apparatus 500, the report creation unit 503 creates a report, based on the first log information, error occurrence information and second log information in the storage unit 501.

Specifically, the report creation unit 503 calculates first response time information which is indicative of a response time between respective services, based on a difference between the date/time information of the request information indicated by the first log information in the storage unit 501, and the date/time information of response information to the request information.

In addition, the report creation unit 503 calculates second response time information which is indicative of a response time with respect to each service, based on a difference between the date/time information of the request information of each service indicated by the second log information in the storage unit 501, and the date/time information of response information to the request information.

Furthermore, the report creation unit 503 creates SLA reports SLA1, SLA2, . . . , which include the calculated first response time information and second response time information, and the error occurrence information in the storage unit 501.

Thereafter, the report creation unit 503 transmits the SLA reports SLA1, SLA2, . . . , to user terminals (not shown) of the respective users.

As has been described above, according to the present embodiment, the information flowing in the respective buses 211a to 213a, and 313 for cooperation between the respective services, which are provided by the respective data center apparatuses 211 to 213 and on premise system 310, is captured. By this configuration, the information of the overall service can be collected from the cooperative service.

To give a supplementary description, by using the common bus 313 for inter-application cooperation in the on premise system 310, the data necessary for the SLA reports SLA1, SLA2, . . . , can automatically be collected.

In addition, by using the buses 211a to 213a for cloud-cloud cooperation, the data necessary for the SLA reports SLA1, SLA2, . . . , can automatically be collected.

Furthermore, by using the buses 213a and 313 for on premise-cloud cooperation (hybrid), the information of the overall service can be collected, and the SLA reports SLA1, SLA2, . . . , can be created.

Further, the report creation system may collect the number of processes, the size of messages, etc., in addition to the first log information, error occurrence information, and second log information. In this case, the tendency of the process load, etc. can also be determined.

In the meantime, as in the conventional art, by periodically collecting the SLA information such as the service log information, OS state and hardware state, the SLA of each service can be confirmed.

Second Embodiment

Next, a report creation system according to a second, embodiment is described with reference to the above-described FIG. 3.

The second embodiment is a modification of the first embodiment, and is, to be more specific, a modification of the SLA information collection unit 502 and report creation unit 503.

In this case, the SLA information collection unit 502 includes, in addition to the above-described function, a second collection function of collecting a plurality of pieces of operation condition information indicative of the operation condition of each service from the respective data center apparatuses 211 to 213 functioning as service providing apparatuses, and the respective on premise apparatuses 311 and 312. The operation condition, in this context, means a condition as to whether an operation is being executed or not.

The report creation unit 503 includes, in addition to the above-described functions, a third calculation function of calculating an overall service operation rate indicative of the service operation rate of all of the services, based on the collected plural pieces of operation condition information. In addition, the report creation unit 503 creates SLA reports SLA1, SLA2, . . . , which further include the calculated overall service operation rate.

According to the above-described configuration, in addition to the advantageous effects of the first embodiment, the report creation apparatus 500 can collect the plural pieces of operation condition information from the respective data center apparatuses 211 to 213 and the respective on premise apparatuses 311 and 312, can calculate the overall service operation rate, based on the plural pieces of operation condition information, and can create the SLA reports SLA1, SLA2, . . . , which further include the overall service operation rate.

In addition, not only the conventional SLA (the service level, the target of which is an elemental service such as an operation condition of a machine), but also the operation condition of services is recorded. Thereby, the service operation condition of the entire system, such as B2B, can be confirmed.

Further, by collecting the information of all services, the service level of all services and the service level of each service can be respectively confirmed.

Third Embodiment

FIG. 4 is a schematic view illustrating a report creation system according to a third embodiment and a peripheral configuration thereof. The same parts as in FIG. 3 are denoted by like reference numerals, and a detailed description thereof is omitted. Different parts will mainly be described. Similarly, an overlapping description will be omitted in connection with the respective embodiments to be described below.

The third embodiment is a modification of the first or second embodiment. Compared to the configuration illustrated in FIG. 3, the report creation apparatus 500 further includes a reference information update unit 506. In accordance with this, the storage unit 501 stores, in addition to the above-described pieces of information, a plurality of pieces of first response time reference candidate information indicative of a plurality of reference candidates of the first response time information. In addition, the storage unit 501 stores pre-selected first response time reference candidate information, among the plural pieces of first response time reference candidate information, as first response time reference information.

The reference information update unit 506 includes the following functions (f506-1) to (f506-3).

(f506-1) A comparison function of comparing the first response time information, which was calculated by the report creation unit 503, and the first response time reference information in the storage unit 501.

(f506-2) A selection function of newly selecting, when both information pieces are different as a result of the comparison, any one piece of first response time reference candidate information from among the pieces of first response time reference candidate information included between the values of both information pieces. This selection may be executed, for example, in accordance with an operation of the user.

(f506-3) A recommendation function of outputting the newly selected first response time reference candidate information as recommendable first response time reference information.

According to the above-described configuration, in addition to the advantageous effects of the first or second embodiment, the report creation apparatus 500 can compare the calculated first response time information and the first response time reference information in the storage unit 501, can newly select, when both information pieces are different, any one of first response time reference candidate information from among the pieces of first response time reference candidate information included between the values of both information pieces, and can output the newly selected first response time reference candidate information as recommendable first response time reference candidate information.

To give a supplementary description, by analyzing the collected information, the information (first response time reference candidate information) of a recommendable SLA can be presented in place of the current SLA. In addition, a recommendable SLA, such as an SLA of a higher level than the current SLA, can be selected. Furthermore, a business operator can recommend an SLA, which meets the current condition, to the user.

Fourth Embodiment

FIG. 5 is a schematic view illustrating a report creation system according to a fourth embodiment and a peripheral configuration thereof.

The fourth embodiment illustrates a concrete example of the first embodiment. The report creation system is connected to a cloud service (B2B2C system) which provides the next day's power demand estimation.

In this case, the cloud service is a cooperative service in which services A, B and C are made to cooperate.

The service A includes a data center apparatus 201 which provides weather forecast data d1, as illustrated in FIG. 6, to the on premise system 310. Since the service A is a cloud service which a third party provides, a bus for a cooperative service is not introduced in the data center apparatus 201.

The weather forecast data d1 includes, for instance, an area, a date/time, a weather, a temperature, a humidity, and a sunshine rate. In addition, the data center apparatus 201 may periodically provide the weather forecast data d1, or may provide the weather forecast data d1 in response to a request.

The service B includes first and second on premise apparatuses 311 and 312, a common bus 313, and a system cooperation board 314.

The first on premise apparatus 311 stores past power actual result data d2, as illustrated in FIG. 7.

The second on premise apparatus 312 includes a function of calculating power demand estimation data d3, as illustrated in FIG. 8, based on the past power actual result data d2 in the second on premise apparatus 311, and the weather forecast data d1 provided from the service A. In addition, the second on premise apparatus 312 includes a function of providing the calculated power demand estimation data d3 to the service C.

The common bus 313 and system cooperation board 314 have the same configurations as described above.

The service C includes a data center apparatus 211 which publicizes the power demand estimation data d3, which was provided from the service B, to user terminals 601, 602. As described above, the data center apparatus 211 includes the bus 211a for the cooperative service.

On the other hand, the report creation system is configured such, that, compared to the above-described configuration illustrated in FIG. 3, the information collection apparatuses 412 and 413 are omitted in accordance with the cloud service in which the data center apparatuses 212 and 213 are absent.

Specifically, the report creation system includes first and second information collection apparatuses 414 and 411, and a report creation apparatus 500.

The first information collection apparatus 414 is provided on the bus 313 for individual corporation between the services A, B and C, and collects first log information d4 including an information type (type), a service ID and date/time information, and error occurrence information d5 including an error code, an error occurrence location (service ID) and date/time information, as illustrated in FIG. 9 and FIG. 10, from the request information and response information flowing in the bus 313, incidentally, the first log information d4 may further include information (e.g., job ID and task ID) which is in a lower level than the service ID. The error occurrence location included in the error occurrence information d5 may be any information indicative of the location of occurrence of an error, and is not limited to the service ID. For example, the error occurrence location may be other information such as the ID of the data center apparatus.

The second information collection apparatus 411 is provided on the bus 211a for individual corporation between the services B and C, and collects first log information d6 including an information type (type), a service ID and date/time information, and error occurrence information d7 including an error code, an error occurrence location (service ID) and date/time information, as illustrated in FIG. 11 and FIG. 12, from the request information and response information flowing in the bus 211a. Incidentally, the first log information d6 may further include information (e.g., job ID and task ID) which is in a lower level than the service ID. The error occurrence location included in the error occurrence information d7 may be any information indicative of the location of occurrence of an error, and is not limited to the service ID. For example, the error occurrence location may be other information such as the ID of the data center apparatus.

The respective units 501 to 505 of the report creation apparatus 500 are the same as those in the first embodiment. A description is now given of examples of the first log information, error occurrence information and first response time information in the storage unit 501.

The storage unit 501 stores first log information d8 which is created by accumulating the first log information d4, d6 collected from the information collection apparatus 411, 414, as illustrated in FIG. 13.

Similarly, the storage unit 501 stores error occurrence information d9 which is created by accumulating the error occurrence information d5, d7 collected from the information collection apparatus 411, 414, as illustrated in FIG. 14.

In addition, the storage unit 501 stores first response time information d10 indicative of a response time between the services, which was calculated by the report creation unit 503, as illustrated in FIG. 15. The first response time information d10 includes a service ID for identification between the services, and the response time between the services.

Incidentally, the storage unit 501 may store table-format data, as illustrated in FIG. 13 to FIG. 15, or may store character-string data as a file. In short, the format in which the storage unit 501 stores data is arbitrary.

In addition, the user terminals 601, 602 include a function of viewing the power demand estimation data d3 from the data center apparatus 211 of the service C, in accordance with an operation of the user.

Next, the operation of the report creation system with the above-described structure is described.

To begin with, in the cooperative service in which the services A, B and C are made to cooperate, the on premise apparatus 312 of the service B transmits a request for the weather forecast data d1 indicative of the next day's weather to the data center apparatus 201 of the service A.

As a response to this request, the data center apparatus 201 of the service A returns the weather forecast data d1 to the on premise apparatus 312 of the service B.

The on premise apparatus 312 of the service B reads out, via the bus 313, the past power actual result data d2 in the on premise apparatus 311.

The on premise apparatus 312 of the service B calculates the next day's power demand estimation data d3, based on the past power actual result data d2 and the next day's weather forecast data d1, and transmits the power demand estimation data d3 to the data center apparatus 211 of the service C.

The data center apparatus 211 of the service C publicizes this power demand estimation data d3.

The user terminals 601, 602 view the power demand estimation data d3 from the data center apparatus 211 of the service C, in accordance with an operation of the user.

In association with the cooperative service which operates as described above, the report creation system operation as follows.

The information collection apparatuses 411, 414 collect the first log information d4, d6 and the error occurrence information d5, d7 from the request information and response information flowing in the buses 211a, 313, and transmit the first log information d4, d6 and the error occurrence information d5, d7 to the report creation apparatus 500.

In the report creation apparatus 500, the collection apparatus communication unit 505 receives the first log information d4, d6 and error occurrence information d5, d7 from the respective information collection apparatuses 411 to 414, and writes the first log information d4, d6 and error occurrence information d5, d7 in the storage unit 501. The storage unit 501 stores the first log information d8 which is created by accumulating the first log information d4, d6. Similarly, the storage unit 501 stores the error occurrence information d9 which is created by accumulating the error occurrence information d5, d7.

In addition, in the report creation apparatus 500, the SLA information collection unit 502 collects the second log information of each service from the respective data center apparatuses 211 to 213 and the respective on premise apparatuses 311 and 312, and writes the second log information in the storage unit 501.

Thereafter, in the report creation apparatus 500, the report creation unit 503 creates a report, based on the first log information d8, error occurrence information d9 and second log information in the storage unit 501.

Specifically, the report creation unit 503 calculates the first response time information d10 which is indicative of a response time between respective services, based on a difference between the date/time information of the request information indicated by the first log information in the storage unit 501, and the date/time information of response information to the request information.

In addition, the report creation unit 503 calculates the second response time information which is indicative of a response time with respect to each service, based on a difference between the date/time information of the request information of each service indicated by the second log information in the storage unit 501, and the date/time information of response information to the request information.

Furthermore, the report creation unit 503 creates, as illustrated in FIG. 16, SLA reports SLA1, SLA2, . . . , which include the calculated first response time information d10 and second response time information, and the error occurrence information d9 in the storage unit 501.

Furthermore, the report creation unit 503 individually collates the second log information in the storage unit 501 and the service level agreements SLA-1 to SLA-3 of respective users, and writes the collated second log information in the SLA reports SLA1, SLA2, . . . .

Thereafter, the SLA reports SLA1, SLA2, . . . , are transmitted to the user terminals (not shown) of the respective users from the report creation unit 503.

Figure 17:
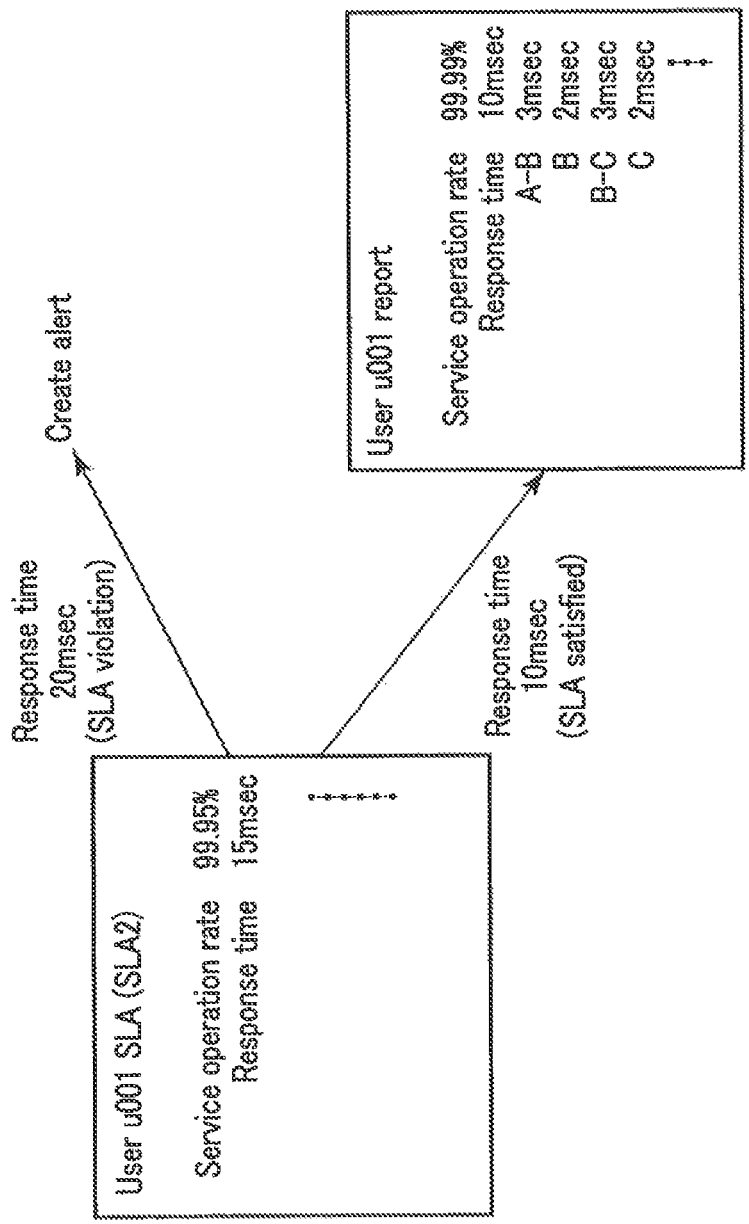
FIG. 17 is a schematic view for describing alert creation in the embodiment.

In addition, as illustrated in FIG. 17, the alert notification unit 504 creates, if the collated result indicates an SLA violation, an alert for each user, which indicates an SLA violation, and notifies the alert to the administrator.

As has been described above, according to the present embodiment, the same advantageous effects as in the first embodiment can be obtained in connection with the concrete example of the cooperative service.

Incidentally, the cooperative service of the embodiment includes the cooperation with the in-company service B and the cooperation with the service A provided by a third party.

In the service A provided by the third party, since a bus cannot be introduced, the data that is collected and analyzed is different. The bus is not introduced in the service A. Thus, the condition of the service A is judged from the information of the in-company service B. Specifically, in the service B (source of cooperation), the data d4, d5 between the service B and the service A (destination of cooperation) is acquired, and thereby the service level of A can be estimated.

The buses 211a, 313 are introduced in the services B, C. Thus, by acquiring the information flowing in the buses 211a, 313, a more detailed analysis can be made. For example, a detailed analysis, such as confirming the service level of each process in the service A, can be made.

Fifth Embodiment

FIG. 18 is a schematic view illustrating a report creation system according to a fifth embodiment and a peripheral configuration thereof.

The fifth embodiment is a concrete example of the second embodiment which is a modification of the SLA information collection unit 502 and report creation unit 503, and the third embodiment which further includes the reference information update unit 506, compared to the configuration illustrated in FIG. 5.

Figure 19:
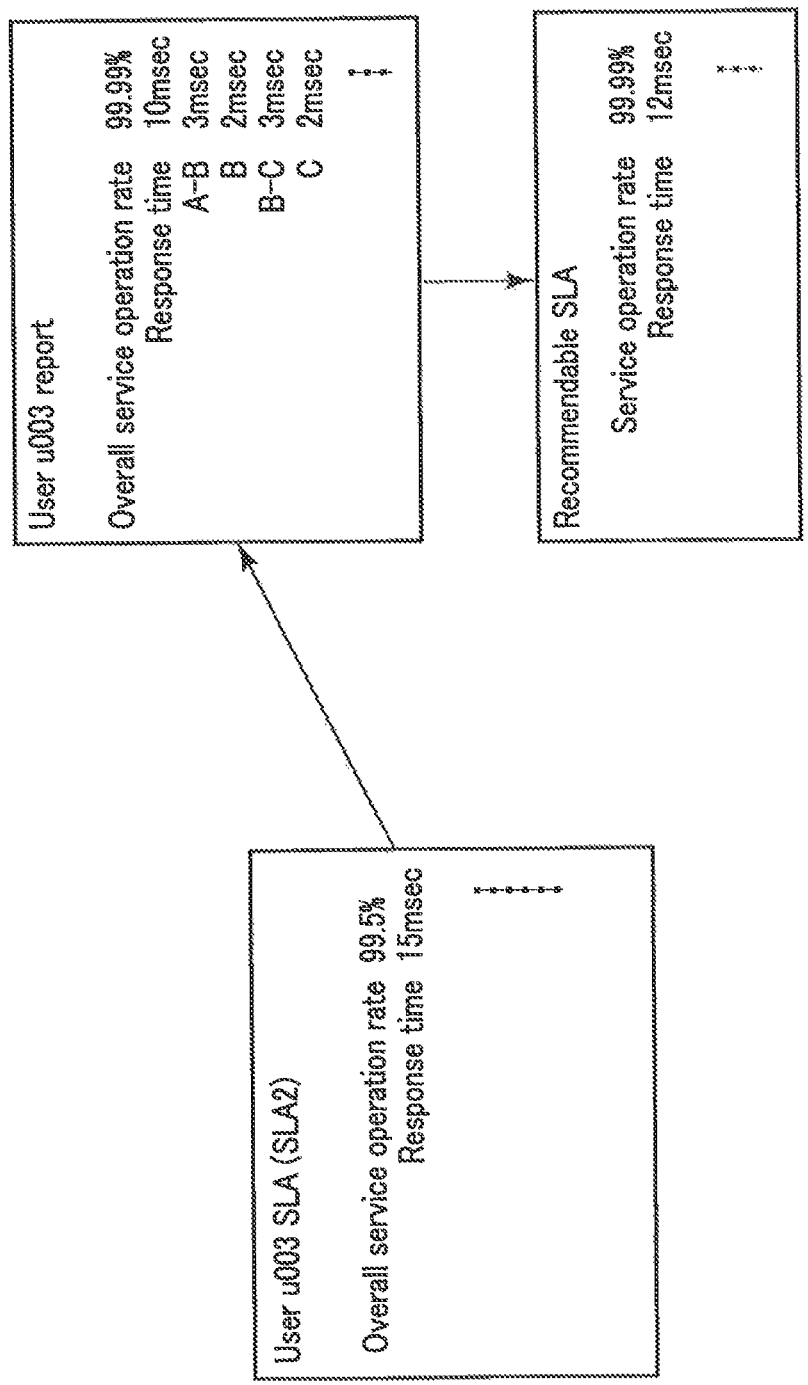
FIG. 19 is a schematic view for describing an overall service operation rate and creation of a recommended SLA in the embodiment.

For example, as illustrated in FIG. 19, the report creation unit 503 calculates an overall service operation rate "99.99%" which is indicative of the service operation rate of all of the respective services, based on the plural pieces of operation condition information collected by the SLA information collection unit 502. In addition, the report creation unit 503 creates a user u003 report which further includes the calculated overall service operation rate.

In addition, the reference information update unit 506 compares first response time information "10 msec", which was calculated by the report creation unit 503, and first response time reference information "15 msec" in the storage unit 501.

Since both information pieces are different as a result of the comparison, the reference information update unit 506 newly selects first response time reference candidate information "12 msec" from among pieces of first response time reference candidate information "10 msec", "12 msec" and "15 msec" included between the values of both information pieces.

The reference information update unit 506 outputs the newly selected first response time reference candidate information "12 msec" as recommendable first response time reference information.

As has been described above, according to the present embodiment, the same advantageous effects as in the second and third embodiments can be obtained in connection with the concrete example of the cooperative service.

According to at least one of the above-described embodiments, the information flowing in the respective buses 211*a* and 313 for cooperation between the respective services, which are provided by the data center apparatus 211 and on premise system 310, is captured. By this configuration, the information of the overall service can be collected from the cooperative service.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions, indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A centralized report creation system for improving collection of information regarding a distributed cooperative service and creating a report indicative of a condition of the distributed cooperative service in which a plurality of services are made to cooperate, the plurality of services being provided by a plurality of service providing apparatuses including at least one service providing apparatus in a company and including at least one service providing apparatus in another company, comprising:

a plurality of information collection apparatuses individually provided on a plurality of buses for individual cooperation between the plurality of services, and each configured to collect first log information including an information type, a service ID and date/time information, and error occurrence information including an error code, an error occurrence location and date/time information, from request information and response information flowing in each of the buses; and a report creation apparatus configured to create the report, based on the first log information and the error occurrence information collected by each of the information collection apparatuses, and second log information of each of the services collected from each of the service providing apparatuses, wherein each of the information collection apparatuses comprises:

a first storage device which stores the first log information and the error occurrence information;

a capturing device which captures the request information and the response information from the each of the buses, collects the first log information and the error occurrence information from the captured request information and response information, and writes the first log information and the error occurrence information in the first storage device; and a transmission device which transmits the first log information and the error occurrence information in the first storage device to the report creation apparatus, and the report creation apparatus comprises:

a second storage device which stores the first log information, the error occurrence information and the second log information;

a first collection device which collects the second log information from each of the service providing apparatuses, and writes the second log information in the second storage device;

a reception device which receives the first log information and the error occurrence information from each of the information collection apparatuses, and writes the first log information and the error occurrence information in the second storage device;

a first calculation device which calculates first response time information which is indicative of a response time between the services, based on a difference between date/time information of request information indicated by the first log information in the second storage device, and date/time information of response information to the request information;
a second calculation device which calculates second response time information which is indicative of a response time with respect to each of the services, based on a difference between date/time information of request information of each service indicated by the second log information in the second storage device, and date/time information of response information to the request information; and
a report creation device which creates the report including the calculated first response time information and second response time information, and the error occurrence information in the second storage device.

2. The report creation system of claim 1, wherein the report creation apparatus further comprises:
a second collection device which collects a plurality of pieces of operation condition information indicative of an operation condition of each service from each of the service providing apparatuses; and
a third calculation device which calculates an overall service operation rate indicative of a service operation rate of all of the services, based on the collected plurality of pieces of operation condition information,
wherein the report creation device creates the report which further includes the calculated overall service operation rate.

3. The report creation system of claim 1, wherein the report creation apparatus further comprises:
a candidate information storage device which stores a plurality of pieces of first response time reference candidate information indicative of a plurality of reference candidates of the first response time information;
a reference information storage device which stores preselected first response time reference candidate information, among the plurality of pieces of first response time reference candidate information, as first response time reference information;
a comparison device which compares the calculated first response time information and the first response time reference information;
a selection device which newly selects, when both information pieces are different as a result of the comparison, any one piece of first response time reference candidate information from among the pieces of first response time reference candidate information included between values of both information pieces; and
a recommendation device which outputs the newly selected first response time reference candidate information as recommendable first response time reference information.

4. A program stored in a non-transitory computer-readable storage medium, and used in a centralized report creation apparatus for improving collection of information regarding a distributed cooperative service and creation of a report indicative of a condition of the distributed cooperative service, which is communicable with a plurality of information collection apparatuses individually provided on a plurality of buses for individual cooperation between a plurality of distributed services which are provided by a plurality of service providing apparatuses including at least one service providing apparatus in a company and including at least one service providing apparatus in another company,
wherein each of the information collection apparatuses is an apparatus configured to collect first log information including an information type, a service ID and date/time information, and error occurrence information including an error code, an error occurrence location and date/time information, from request information and response information flowing in each of the buses,
the report creation apparatus is an apparatus which includes storage device and is configured to create a report indicative of a condition of the cooperative service in which the plurality of services are made to cooperate, based on the first log information and the error occurrence information collected by each of the information collection apparatuses, and second log information of each of the services collected from each of the service providing apparatuses, and
the program causes the report creation apparatus to executing a method, the method includes:
collecting the second log information from each of the service providing apparatuses, and writing the second log information in the storage device;
receiving the first log information and the error occurrence information from each of the information collection apparatuses, and writing the first log information and the error occurrence information in the storage device;
calculating first response time information which is indicative of a response time between the services, based on a difference between date/time information of request information indicated by the first log information in the storage device, and date/time information of response information to the request information;
calculating second response time information which is indicative of a response time with respect to each of the services, based on a difference between date/time information of request information of each service indicated by the second log information in the storage device, and date/time information of response information to the request information; and
creating the report including the calculated first response time information and second response time information, and the error occurrence information in the storage device.

5. The program of claim 4, wherein the method further comprises:
collecting a plurality of pieces of operation condition information indicative of an operation condition of each service from each of the service providing apparatuses; and
calculating an overall service operation rate indicative of a service operation rate of all of the services, based on the collected plurality of pieces of operation condition information, and
wherein the creating the report includes creating the report which further includes the calculated overall service operation rate.

6. The program of claim 4, wherein the report creation apparatus further comprises a candidate information storage device and a reference information storage device, and
the method further comprises:
writing in the candidate information storage device a plurality of pieces of first response time reference candidate information indicative of a plurality of reference candidates of the first response time information;

writing in the reference information storage device pre-selected first response time reference candidate information, among the plurality of pieces of first response time reference candidate information, as first response time reference information;

comparing the calculated first response time information and the first response time reference information;

newly selecting, when both information pieces are different as a result of the comparison, any one piece of first response time reference candidate information from among the pieces of first response time reference candidate information included between values of both information pieces; and outputting the newly selected first response time reference candidate information as recommendable first response time reference information.

* * * * *